Nov. 7, 1950          H. G. PROCTOR          2,529,185
COLLAPSIBLE TAKE-UP SPOOL
Filed Nov. 21, 1946          2 Sheets—Sheet 1
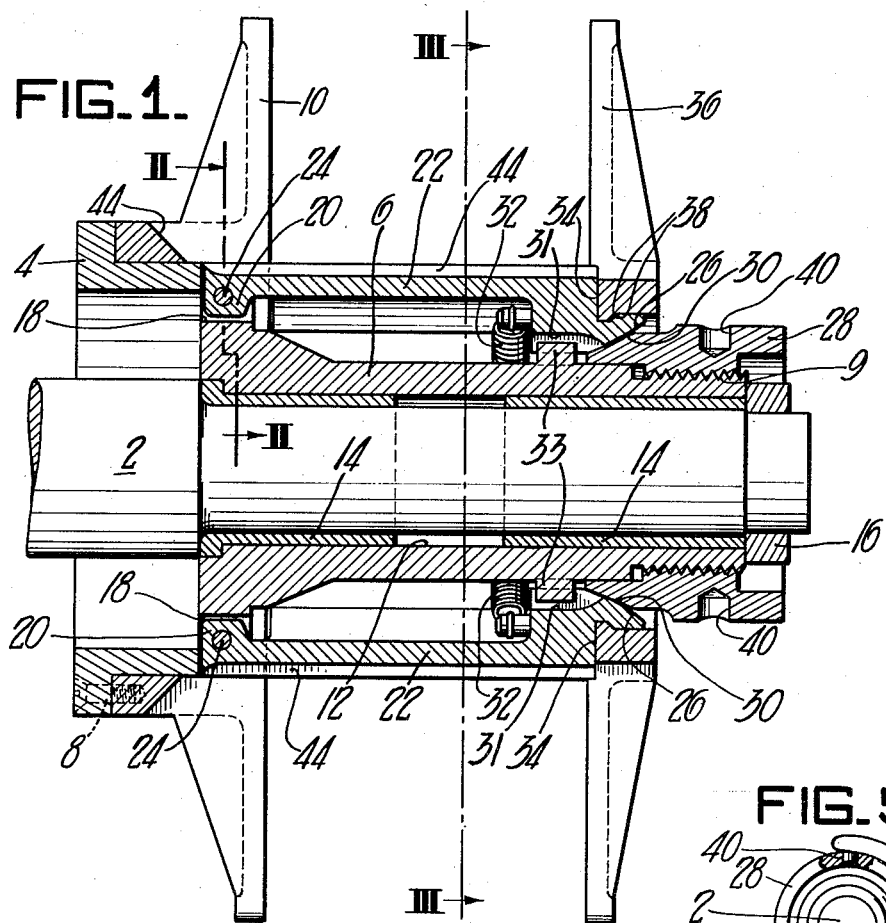
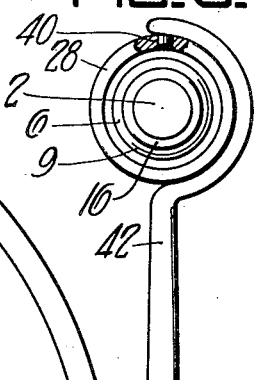
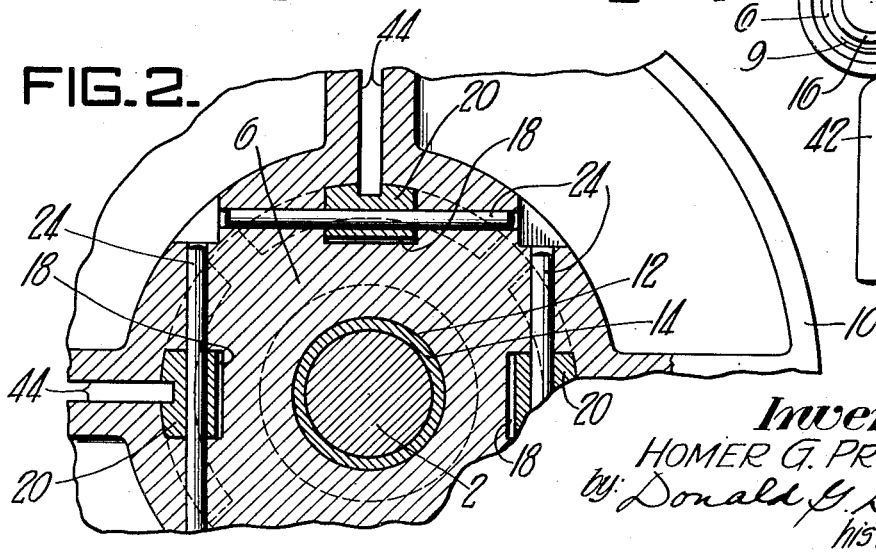
Inventor:
HOMER G. PROCTOR,
by Donald G. Dalton
his Attorney.

Nov. 7, 1950  H. G. PROCTOR  2,529,185
COLLAPSIBLE TAKE-UP SPOOL
Filed Nov. 21, 1946  2 Sheets-Sheet 2

Inventor:
HOMER G. PROCTOR,
by: Donald G. Dalton
his Attorney.

Patented Nov. 7, 1950

2,529,185

UNITED STATES PATENT OFFICE 2,529,185

COLLAPSIBLE TAKE-UP SPOOL

Homer G. Proctor, Waukegan, Ill., assignor to The American Steel and Wire Company of New Jersey, a corporation of New Jersey Application November 21, 1946, Serial No. 711,275

8 Claims. (Cl. 242—111)

This invention relates to a collapsible take-up spool and more particularly to such a spool for coiling wire after the wire has been drawn or otherwise processed.

Prior to my invention the type of spool most commonly used formed coils having a tapered opening therethrough. It was difficult to remove the coils of wire from this type of spool and therefore considerable time was lost in changing coils.

It is an object of my invention to provide a collapsible take-up spool which will coil wire into coils having a uniform internal diameter.

Another object is to provide such a spool which allows for a quick and easy removal of the coiled wire therefrom by the simple manipulation of one part of the assembly.

These and other objects will be more apparent after referring to the following specification and attached drawings, in which:

Figure 1 is a sectional view of the assembled spool;

Figure 2 is a sectional view taken on the line II—II of Figure 1;

Figure 5 is a view, partly in section, showing the wrench in position for loosening the nut to permit collapse of the spool.

Figure 3:
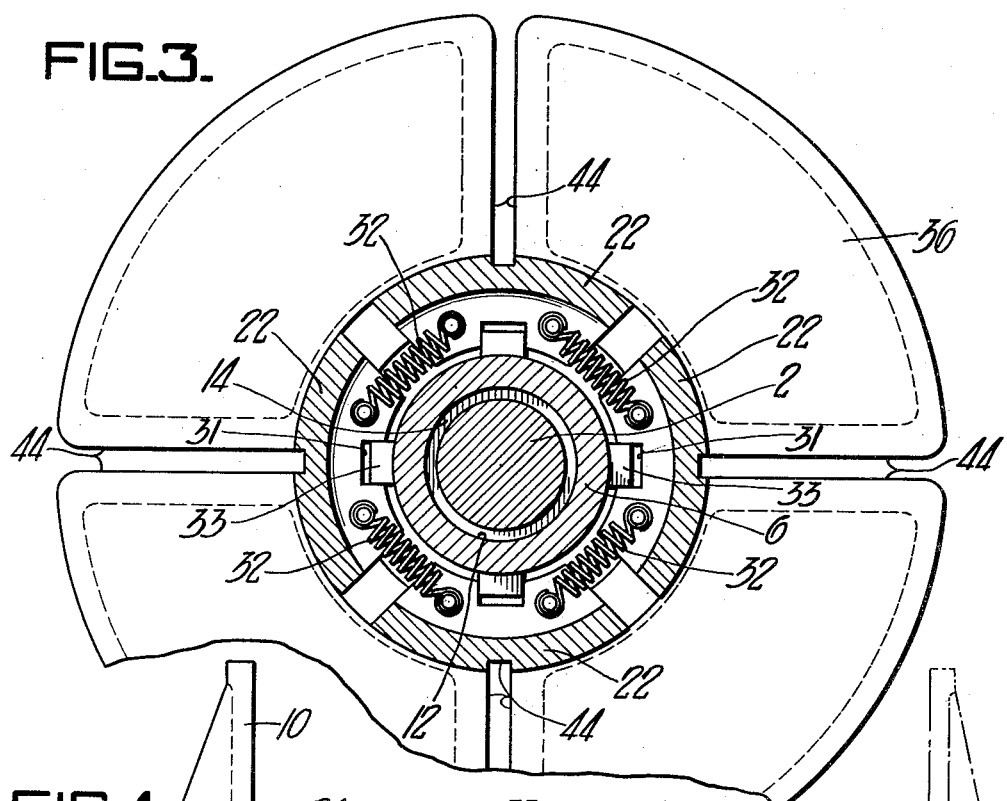
Figure 3 is a sectional view taken on the line III—III of Figure 1.

Referring more particularly to the drawings, the reference numeral 2 indicates a rotating shaft on which the take-up spool is mounted. The take-up spool is driven by means of a friction clutch, the drum 4 of which is fastened to a cast steel hub portion 6 by means of screws 8. The hub portion 6 is provided with threads 9 at one end and a flange 10 at the other end adjacent the drum 4. The bore 12 of hub 6 is provided with bushings 14 which act as bearing surfaces for the rotating shaft 2. A collar 16 is pressed on the end of the rotating shaft 2 and serves to hold the spool assembly thereon. The hub 6 is provided with cut-out portions 18 for receiving the male portions 20 of a plurality (four, as shown) of arcuate barrel segments 22 which are pivotally mounted on pins 24. The free end of each of the barrel sections is provided with a wedge portion 26 on its internal face. A nut 28 is threaded on the threads 9 and extends within the free ends of the barrel segments 22. Wedge surfaces 30 on the outer surface of the nut 28 cooperate with the wedge surfaces 26 to move the barrel segments 22 outwardly. Each of the barrel segments 22 has a groove 31 in the inner side of its free end. Springs 32, connected to adjacent sides of adjacent barrel segments 22, force the barrel segments inwardly against the wedge surface 30, the segments being guided in this movement by lugs 33 on the hub 6 which fit in the grooves 31. The free ends of the barrel segments 22 are provided with shoulders 34 against which is positioned an annular cover plate 36. This cover plate has an axial opening therethrough of sufficient size to permit the plate to pass over the ends of the barrel segments. The outer surfaces of the barrel segments and the inner surface of the cover plate 36 have complementary locking surfaces 38 thereon. The nut 28 may be provided with holes 40 for receiving a tool 42 to tighten or loosen the nut.

Figure 4:
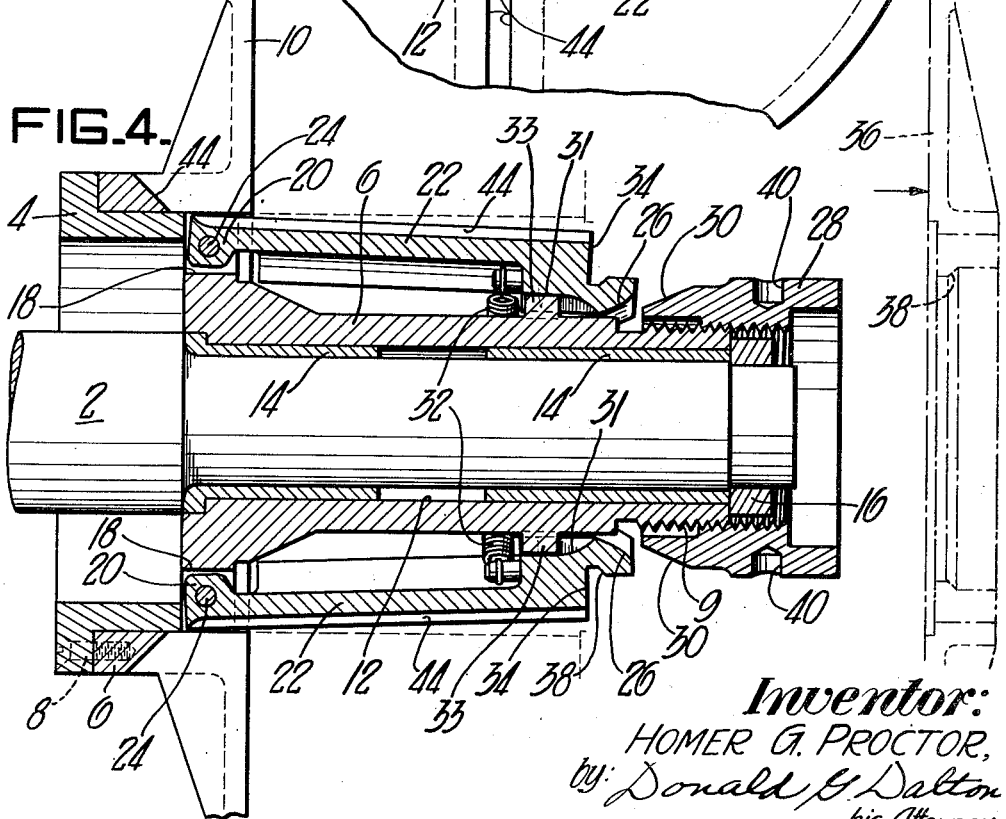
Figure 4 is a sectional view similar to Figure 1, but showing the spool collapsed.

The operation of the device is as follows:

When a coil of wire has been built up on the barrel segments 22 between the flange 10 and the cover plate 36, the rotation of the take-up spool is stopped and the nut 28 is retracted from the position shown in Figure 1 by means of the tool 42 until the barrel segments 22 are moved inwardly by means of springs 32 to a position permitting the cover plate 36 to be removed. In this position, as shown in Figure 4, the barrel segments 22 are no longer in close engagement with the inside of the coil of wire and the coil may be readily removed therefrom. The barrel segments 22, the flange 10 and the cover plate 36 are provided with slots 44 so that tie wires can be passed around the coil to hold the folds thereof in place before collapsing the spool. After the coil is removed, the cover plate 36 is passed over the nut 28 and the ends of the barrel segments 22 and the nut 28 is screwed on the threads 9 until the wedge surface 30 forces the barrel segments 22 outwardly into the position shown in Figure 1, thus locking cover plate 36 in position.

While one embodiment of my invention has been shown and described, it will be apparent that other adaptations and modifications may be made without departing from the scope of the following claims.

I claim:

1. A collapsible take-up spool for coiling wire comprising a rotatable hub portion, said hub portion being free at one end, the said free end being threaded, a flange at the other end of said hub, a plurality of barrel segments pivotally mounted on the end of the hub portion having the flange thereon, said barrel segments being closely spaced so as to form a substantially cylindrical surface for supporting the wire, a wedge surface on the inner side of the free end of the barrel segments, a nut threaded on said hub portion and extending within the free ends of the barrel segments, a wedge surface on said nut cooperating with said wedge surfaces of the barrel segments to move them outwardly, and a cover plate positioned over the free ends of said barrel segments, the inside diameter of said cover plate being greater than the outside diameter of the nut, the outer surfaces of the barrel segments and the inner surface of the cover plate having complementary surfaces thereon for locking the barrel segments and cover plate together when the nut forces the barrel segments outwardly.

2. A collapsible take-up spool for coiling wire comprising a rotatable hub portion, said hub portion being free at one end, the said free end being threaded, a flange at the other end of said hub, a plurality of barrel segments pivotally mounted on the end of the hub portion having the flange thereon, said barrel segments being closely spaced so as to form a substantially cylindrical surface for supporting the wire, a wedge surface on the inner side of the free end of the barrel segments, a nut threaded on said hub portion and extending within the free ends of the barrel segments, a wedge surface on said nut cooperating with said wedge surfaces of the barrel segments to move them outwardly, a cover plate positioned over the free ends of said barrel segments, the outer surfaces of the barrel segments and the inner surface of the cover plate having complementary surfaces thereon for locking the barrel segments and cover plate together when the nut forces the barrel segments outwardly, the inside diameter of said cover plate being greater than the outside diameter of the nut, and resilient means connecting the free ends of said barrel segments to force them inwardly when the nut is retracted from the wedge surfaces of the barrel segments.

3. A collapsible take-up spool for coiling wire comprising a rotatable shaft, a rotatable hub mounted on the end of said shaft, a flange on the inboard end of said hub, a reduced diameter threaded portion on the outboard end of said hub, a plurality of elongated barrel segments arranged around the periphery of said hub, said barrel segments being closely spaced so as to form a substantially cylindrical surface for supporting the wire, a pivot for supporting each segment on the end of the hub having the flange thereon, a wedge surface on the inner side of the free end of the barrel segments, a nut threaded on said threaded portion, a wedge surface on said nut cooperating with said wedge surfaces of the barrel segments to move them outwardly, and a cover plate positioned over the free ends of said barrel segments, the outer surfaces of the barrel segments and the inner surface of the cover plate having complementary surfaces thereon for locking the barrel segments and cover plate together when the nut forces the barrel segments outwardly.

4. A collapsible take-up spool for coiling wire comprising a rotatable shaft, a rotatable hub mounted on the end of said shaft, a flange on the inboard end of said hub, a reduced diameter threaded portion on the outboard end of said hub, a plurality of elongated barrel segments arranged around the periphery of said hub, a pivot for supporting each segment on the end of the hub having the flange thereon, a wedge surface on the inner side of the free end of the barrel segments, a nut threaded on said threaded portion, a wedge surface on said nut cooperating with said wedge surfaces of the barrel segments to move them outwardly, a cover plate positioned over the free ends of said barrel segments, the outer surfaces of the barrel segments and the inner surface of the cover plate having complementary surfaces thereon for locking the barrel segments and cover plate together when the nut forces the barrel segments outwardly, said segments and hub having a space therebetween adjacent the free end of said segments, and a plurality of springs in said space connected to adjacent sides of adjacent barrel segments to force them inwardly against the wedge surface on the nut.

5. A collapsible take-up spool for coiling wire comprising a rotatable shaft, a rotatable hub mounted on the end of said shaft, a flange on the inboard end of said hub, a reduced diameter threaded portion on the outboard end of said hub, a plurality of elongated barrel segments arranged around the periphery of said hub, said barrel segments being closely spaced so as to form a substantially cylindrical surface for supporting the wire, a pivot for supporting each segment on the end of the hub having the flange thereon, a wedge surface on the inner side of the free end of the barrel segments, a nut threaded on said threaded portion, a wedge surface on said nut cooperating with said wedge surfaces of the barrel segments to move them outwardly, a cover plate positioned over the free ends of said barrel segments, the outer surfaces of the barrel segments and the inner surface of the cover plate having complementary surfaces thereon for locking the barrel segments and cover plate together when the nut forces the barrel segments outwardly, the inside diameter of said cover plate being greater than the outside diameter of the nut, and resilient means connecting the free ends of said barrl segments to force them inwardly when the nut is retracted from the wedge surfaces of the barrel segments.

6. A collapsible take-up spool for coiling wire comprising a rotatable shaft, a rotatable hub mounted on the end of said shaft, a flange on the inboard end of said hub, a reduced diameter threaded portion on the outboard end of said hub, a plurality of elongated barrel segments arranged around the periphery of said hub, a pivot for supporting each segment on the end of the hub having the flange thereon, a wedge surface on the inner side of the free end of the barrel segments, a nut threaded on said threaded portion, a wedge surface on said nut cooperating with said wedge surfaces of the barrel segments to move them outwardly, a cover plate positioned over the free ends of said barrel segments, the outer surfaces of the barrel segments and the inner surface of the cover plate having complementary surfaces thereon for locking the barrel segments and cover plate together when the nut forces the barrel segments outwardly, the inside diameter of said cover plate being greater than the outside diameter of the nut, each of said barrel segments having a groove in the inner surface thereof, and a plurality of guiding lugs on said hub, one of said lugs extending into each of said grooves.

7. A collapsible take-up spool for coiling wire comprising a rotatable shaft, a rotatable hub mounted on the end of said shaft, a flange on the inboard end of said hub, a reduced diameter threaded portion on the outboard end of said hub, a plurality of elongated barrel segments arranged around the periphery of said hub, a pivot for supporting each segment on the end of the hub having the flange thereon, a wedge surface on the inner side of the free end of the barrel segments, a nut threaded on said threaded portion, a wedge surface on said nut cooperating with said wedge surfaces of the barrel segments to move them outwardly, a cover plate positioned over the free ends of said barrel segments, the outer surfaces of the barrel segments and the inner surface of the cover plate having complementary surfaces thereon for locking the barrel segments and cover plate together when the nut forces the barrel segments outwardly, the inside diameter of said cover plate being greater than the outside diameter of the nut, each of said barrel segments having a groove in the inner surface thereof, a plurality of guiding lugs on said hub, one of said lugs extending into each of said grooves, said segments and hubs having a space therebetween adjacent the free end of said segments, and a plurality of springs in said space connected to adjacent sides of adjacent barrel segments to force them inwardly against the wedge surface on the nut.

8. A collapsible take-up spool for coiling wire according to claim 7 in which there is a shoulder on the free end of said segments against which the cover plate bears.

HOMER G. PROCTOR.

REFERENCES CITED

The following references are of record in the file of this patent:

UNITED STATES PATENTS

| Number    | Name    | Date           |
|-----------|---------|----------------|
| 771,902   | Frank   | Oct. 11, 1904  |
| 964,023   | Hofmann | July 12, 1910  |
| 1,400,936 | Bull    | Dec. 20, 1921  |
| 1,964,585 | Larsen  | June 26, 1934  |
| 2,225,180 | Olesen  | Dec. 17, 1940  |
| 2,338,933 | Grauer  | Jan. 11, 1944  |
| 2,443,243 | Hayssen | June 15, 1948  |

FOREIGN PATENTS

| Number  | Country | Date          |
|---------|---------|---------------|
| 213,733 | Italy   | Mar. 15, 1941 |
| 855,420 | France  | Feb. 12, 1940 |